Dec. 18, 1951      R. A. WEST      2,578,988
CONTROL SYSTEM FOR ELECTRIC MOTORS
Filed May 16, 1949
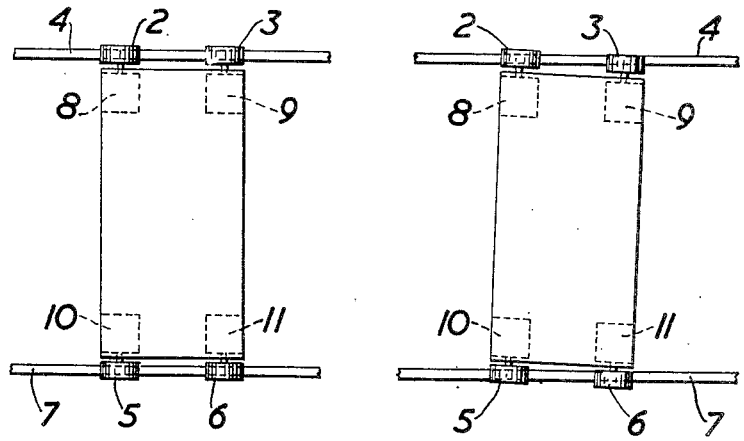
*Fig.1.*     *Fig.2.*
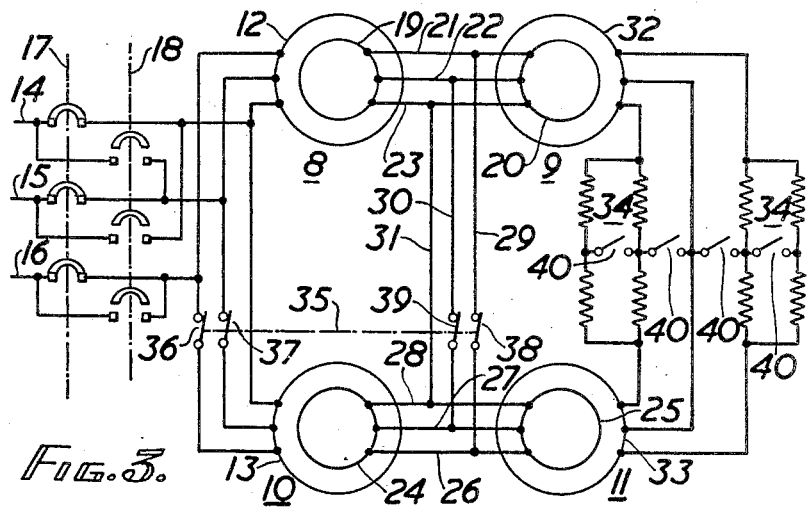
*Fig.3.*
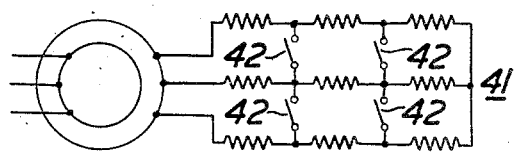
*Fig.4.*
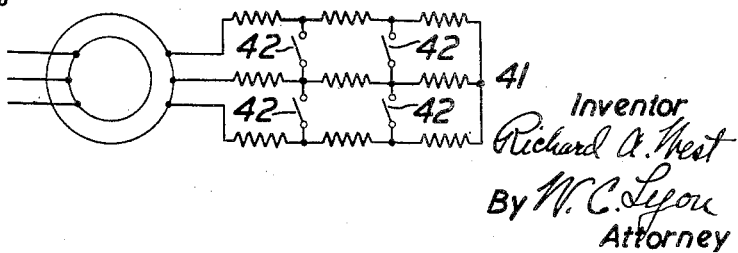
Inventor
Richard A. West
By W. C. Lyon
Attorney Patented Dec. 18, 1951

2,578,988

UNITED STATES PATENT OFFICE 2,578,988

CONTROL SYSTEM FOR ELECTRIC MOTORS

Richard A. West, Dullatur, Dumbarton, Scotland, assignor to Cutler-Hammer, Inc., Milwaukee, Wis., a corporation of Delaware Application May 16, 1949, Serial No. 93,537
In Great Britain May 28, 1948

9 Claims. (Cl. 318—50)

1

This invention relates to control systems for electric motors, and refers more particularly to control systems for the electric motors which drive travelling structures which run on two rails and have independent motors for the driving wheels of the two rails. Examples of such travelling structures are unloaders, ore bridges and overhead travelling cranes. In some of said structures the length of the structure (i. e. the dimension from rail to rail) is great relatively to its width (i. e. dimension longitudinally of the rails) and in such cases there is often a tendency due to unequal loading or friction, for one end of the structure to travel in advance of the other.

The present invention has for its object the provision of means for preventing such misalignment. More specifically the invention has for its object first to achieve synchronism between the motors driving the structure, second to provide means of adjustment to correct any misalignment that may have taken place and third to prevent misalignment when no power is being supplied to the motors, i. e. during coasting.

Further objects are the provision of means whereby synchronous torque between the motors is obtained during starting, and standard motors, together with a relatively small amount of control gear, are employed.

The invention consists broadly of a system of electric motors which drive a travelling structure which runs on two rails and has independent motors for the driving wheels of the two rails, comprising four polyphase induction motors, two for driving the wheels of one rail and two for driving the wheels of the other rail, wherein two of the motors appertaining to different rails (hereinafter called the first two motors) are connected in the so-called "Selsyn" system, and the other two motors (hereinafter called the second two motors) are connected in cascade with said first two motors.

In order that the invention may be the more clearly understood, a travelling structure system in accordance therewith will now be described, reference being made to the accompanying drawings wherein—

Figure 1 is a diagrammatic view of the structure as a whole, showing the two ends in correct alignment.

Figure 2 is a similar view showing the two ends out of alignment.

Figure 3 is a diagrammatic view of the circuit connections for the motors by which the structure is driven.

Figure 4 is a diagrammatic illustration of a

2 possible variation of the arrangement of Figure 3.

Referring to the drawings the structure I has four wheels, viz. two wheels 2 and 3 at one end which run on one (4) of the rails, and two wheels 5 and 6 at the other end which run on the other rail 7. Four slip ring induction motors 8, 9, 10, 11 mounted on the structure respectively drive these four wheels 2, 3, 5, 6 through suitable mechanical transmission gearings. There is no mechanical coupling between the four motors 8, 9, 10, 11 except that each rail necessarily constitutes a mechanical coupling between the two motors which drive the two wheels which run on said rail.

The motors 8 and 10 are those for, say, the leading wheels, while the motors 9 and 11 are those for the following wheels.

The stator windings 12, 13 of the motors 8 and 10 are connected in parallel to the three phase supply lines 14, 15, 16 through forward and reverse contactors 17, 18. The three phases of the rotor winding 19 of the motor 8 are directly connected respectively to the corresponding phases of the rotor winding 20 of the motor 9, by means of conductors 21, 22, 23, and the three phases of the rotor winding 24 of the motor 10 are similarly connected to the corresponding phases of the rotor winding 25 of the motor 11, by means of conductors 26, 27, 28. The three conductors 21, 22, 23 are connected respectively to the corresponding three conductors 26, 27, 28 by means of bridging conductors 29, 30, 31, and thus the motors 8 and 10, with their stators 12, 13 connected in parallel and their rotors 19, 24 connected together by the bridging conductors 29, 30, 31, are connected in the so-called "Selsyn" system.

In the arrangement of Figure 3 the three phases of the stator 32 of the motor 9 are respectively connected to the corresponding three phases of the stator 33 of the motor 11, variable resistance 34 being included in the connections, for the purpose of starting and controlling the speed of the four motors. This arrangement could however be replaced by the more conventional arrangement of Figure 4 in which the two stators 32 and 33 have each its own controlling resistance 41.

Considering the motors 8 and 10 alone, these as before stated are connected in the so-called "Selsyn" system. A particular feature of this system is that between zero speed and half speed the motors run in synchronism. Above half speed, however, the synchronising torque between the motors decreases rapidly. The motors 9 and 11 are connected in cascade with the motors 8 and 10 respectively. Also the motors 8 and 9 are mechanically coupled together as before described by the rail 4, and the motors 10 and 11 are mechanically coupled together by the other rail 7. It is well known that two similar induction motors connected in cascade and mechanically coupled together will have a synchronous speed of half that of either motor if allowed to run independently. Thus in the present instance the four motors 8, 9, 10, 11 will have a synchronous speed of half that of any one of them running independently. In other words the motors 8 and 10 are never allowed to accelerate above half speed and therefore they would be able to exert a powerful synchronising torque.

Thus while all the motors supply driving power to the travelling structure 1, the motors 8 and 10 provide the synchronising torque, and the motors 9 and 11, by virtue of the cascade connections keep the speed down so that the synchronising torque is always maintained.

The resistances 34 (Figure 3) connected between the stator windings 32, 33 of motors 9 and 11, and controlled by contactors 40, are for starting all four motors and controlling their speed. These resistances are in only two of the phases. It will be noticed that, with this arrangement, although four motors are employed only one set of control gear is required and thus there is an advantage over systems in which one set of control gear is employed for each motor.

In the arrangement of Figure 4 the resistances 41, controlled by the contactors 42, exercise the same function as the resistances 34 in the more conventional manner. The contactors 40 (or 42) will of course operate in pairs in sequence.

It is sometimes necessary to move one end only of the travelling structure 1 to correct any misalignment. For this purpose, a four pole switch 35 is provided which may be opened to disconnect the motors 10 and 11 from the mains. Thus the motors 8 and 9 only can be energised whereby that particular end of the structure can be moved slightly in one direction or the other according to which of the reversing contactors 17, 18 is closed. It will be understood that the said four pole switch 35 will have two (36, 37) of its poles in the appropriate conductors between the motor 10 and the reversing contactors, 17, 18 and its other two poles 38, 39 in the corresponding bridging conductors 29, 30.

During coasting there may be a tendency for one end of the structure 1 to lag behind the other, due to unequal loading or friction. With this system of connecting motors the method of control may readily be such that a synchronising torque is set up and thus the tendency to misalignment is corrected.

Thus when coasting the contactors 40 controlling the resistance 34 between the stator windings 32, 33 of the motors 9, 11 are all de-energised so that this resistance is at a maximum. The stator windings 12, 13 of the motors 8 and 10 are, however, left connected to the lines. With the special rotor connections adopted the effect of dropping out these contactors 40 is to leave the stators 32, 33 of the motors 9 and 11 virtually on open circuit.

Actually there is at low speed a "Selsyn" reaction between these two motors 9 and 11, but its effect is not great. The main point is, of course, that the stators 12, 13 of the motors 8 and 10 remain energized at full voltage and their rotors 19, 24 are more or less on open circuit except for the peculiar impedance effect of the motors 9 and 11; consequently practically all effective current, if any, in the rotors 19, 24 of the motors 8 and 10 is current which flows through the "Selsyn" interconnectors to correct any tendency to misalignment during coasting at any speed.

Although the structure is described as having four wheels, one for each motor, it could obviously have two or more wheels for each motor, so that the total number of wheels would be any multiple of four.

Again although only two rails have been referred to there could obviously be two pairs of rails.

I claim:

1. A system of electric motors which drive a travelling structure which runs on two rails and has independent motors for the driving wheels of the two rails, comprising four polyphase induction motors, two for driving the wheels of one rail and two for driving the wheels of the other rail, wherein two of the motors appertaining to different rails are electrically interconnected to provide a synchronizing torque therebetween and the other two motors appertaining to different rails are connected in cascade with said two interconnected motors.

2. A system of electric motors which drive a travelling structure which runs on two rails and has independent motors for the driving wheels of the two rails, comprising four polyphase induction motors, two for driving the wheels of one rail and two for driving the wheels of the other rail, wherein the stator windings of two of the motors appertaining to different rails are connected in parallel to the supply lines, the corresponding phases of the secondary windings of said two motors last mentioned are connected together and are also connected respectively to the corresponding phases of the secondary windings of the other two motors appertaining to different rails, such latter connections in each case being between motors appertaining to the same rail, and the stators of the second two motors appertaining to different rails have controlling resistance connected in circuit therewith, whereby two motors appertaining to different rails are connected in the so-called "Selsyn" system, and the other two motors are connected in cascade with the "Selsyn" connected motors, and said motors of each rail are mechanically coupled.

3. A system according to claim 2, wherein the corresponding phases of the stators of said other two motors last mentioned appertaining to different rails are connected together with said controlling resistance included in the connections.

4. A system according to claim 2, wherein means are provided for disconnecting from the source the two motors which appertain to one of the rails, whereby the two motors which appertain to the other rail can be operated to correct any misalignment between the ends of the structure.

5. A system according to claim 2, wherein the disconnecting means comprise a multi pole switch having certain of its contacts in the appropriate connections between the supply lines and the one of the "Selsyn" connected motors which is to be disconnected from the source, and other of its contacts in the appropriate connections between the phases of the secondary windings of said "Selsyn" connected motors.

6. In a traveling structure having independent propulsion units, in combination, a first propulsion unit comprising first and second polyphase induction motors, a second propulsion unit comprising third and fourth polyphase induction motors, means for connecting the primary windings of said first and third motors for supply of electrical energy thereto, means connecting said second and fourth motors in cascade with said first and third motors respectively, and means interconnecting the corresponding phases of the secondary windings of all of said motors.

7. The combination according to claim 6, including individual means for mechanically coupling the motors in each of said propulsion units.

8. The combination according to claim 7, including means providing controlling resistance in circuit with the primary windings of said second and fourth motors.

9. The combination according to claim 8, wherein the primary windings of said second and fourth motors are connected together with said controlling resistance included in the connections.

RICHARD A. WEST.

REFERENCES CITED

The following references are of record in the file of this patent:

UNITED STATES PATENTS

| Number | Name | Date |
| --- | --- | --- |
| 587,340 | Steinmetz | Aug. 3, 1897 |
| 1,220,763 | Martin | Mar. 27, 1917 |